United States Patent
Uscumlic et al.

(10) Patent No.: US 12,261,779 B2
(45) Date of Patent: Mar. 25, 2025

(54) PROTOCOL INDEPENDENT DETERMINISTIC TRANSPORT OF DATA IN A TIME-SENSITIVE NETWORK

(71) Applicant: Nokia Solutions and Networks Oy, Espoo (FI)

(72) Inventors: Bogdan Uscumlic, Massy (FR); Andrea Enrici, Massy (FR)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 18/525,978

(22) Filed: Dec. 1, 2023

(65) Prior Publication Data

US 2024/0236005 A1 Jul. 11, 2024

(30) Foreign Application Priority Data

Jan. 9, 2023 (FI) .................................... 20235021

(51) Int. Cl.
*H04L 47/22* (2022.01)
*H04L 41/14* (2022.01)

(52) U.S. Cl.
CPC ............ *H04L 47/22* (2013.01); *H04L 41/145* (2013.01)

(58) Field of Classification Search
CPC ..... H04L 47/10; H04L 47/2441; H04L 47/43; H04L 47/2458; H04L 47/2408;
(Continued)

(56) References Cited

U.S. PATENT DOCUMENTS

| | | | | |
|---|---|---|---|---|
| 2002/0114462 A1* | 8/2002 | Kudo | ................. | G11B 20/0021 348/E5.002 |
| 2003/0169687 A1* | 9/2003 | Bardini | ................... | H04L 47/26 370/479 |

(Continued)

FOREIGN PATENT DOCUMENTS

| | | |
|---|---|---|
| CN | 115396378 A | 11/2022 |
| WO | 2022/242234 A1 | 11/2022 |

OTHER PUBLICATIONS

"Deterministic Networking (detnet)", Datatracker, Retrieved on Nov. 16, 2023, Webpage available at : https://datatracker.ietf.org/wg/detnet/about/.
(Continued)

*Primary Examiner* — Djenane M Bayard
(74) *Attorney, Agent, or Firm* — Tong, Rea, Bentley & Kim, LLC

(57) ABSTRACT

In some examples, an apparatus for protocol independent deterministic transport of data in a time-sensitive network comprises a processor, a memory coupled to the processor, the memory configured to store program code executable by the processor, the program code comprising one or more instructions, whereby to cause the apparatus to receive synchronisation data from the network, the synchronisation data comprising a measure for a clock frequency supporting transport of deterministic data traffic over the network, receive multiple input packets, the input packets comprising deterministic data traffic and non-deterministic data traffic, and generate, from the multiple input packets and using the synchronisation data, a set of isochronous output packets comprising respective payloads and headers.

12 Claims, 3 Drawing Sheets

(58) Field of Classification Search
CPC ......... H04L 47/30; H04L 47/27; H04L 47/15; H04L 47/2433; H04L 47/263; H04L 47/431; H04L 47/19; H04L 47/56; H04L 47/62

See application file for complete search history.

(56) References Cited

U.S. PATENT DOCUMENTS

| | | | | |
|---|---|---|---|---|
| 2007/0162981 | A1* | 7/2007 | Morioka | H04L 63/0428 713/168 |
| 2008/0273460 | A1* | 11/2008 | Lamothe | H04J 3/0635 370/231 |
| 2009/0022179 | A1* | 1/2009 | Frecassetti | H04L 1/0003 370/474 |
| 2014/0115219 | A1* | 4/2014 | Ajanovic | G06F 13/4068 710/305 |
| 2022/0247682 | A1 | 8/2022 | Zhu et al. | |
| 2022/0311715 | A1 | 9/2022 | Schubert et al. | |

OTHER PUBLICATIONS

Varga et al., "Deterministic Networking (DetNet) Data Plane: MPLS over IEEE 802.1 Time-Sensitive Networking (TSN)", RFC 9037, Internet Engineering Task Force (IETF), Jun. 2021, pp. 1-12.

"EtherCAT—the Ethernet Fieldbus", Beckhoff Worldwide, Retrieved on Nov. 16, 2023, Webpage available at : https://www.beckhoff.com/en-en/products/i-o/ethercat/.

"Benefits", Profibus, Retrieved on Nov. 16, 2023, Webpage available at : https://www.profibus.com/technology/profinet/benefits.

"IEEE 802.1Q", Wikipedia, Retrieved on Nov. 16, 2023, Webpage available at : https://en.wikipedia.org/wiki/IEEE_802.1Q.

"IEEE Standard for Local and Metropolitan Area Networks—Timing and Synchronization for Time-Sensitive Applications", IEEE Computer Society, IEEE Std 802.1AS™, Jun. 19, 2020, 421 pages.

"IEEE Standard for Local and metropolitan area networks—Virtual Bridged Local Area Networks Amendment 12: Forwarding and Queuing Enhancements for Time-Sensitive Streams", IEEE Computer Society, IEEE Std 802.1Qav™, Jan. 5, 2010, 87 pages.

"IEEE Standard for Local and metropolitan area networks—Virtual Bridged Local Area Networks Amendment 14: Stream Reservation Protocol (SRP)", IEEE Computer Society, IEEE 802.1Qat, Sep. 30, 2010, 119 pages.

"IEEE Standard for Local and Metropolitan Area Networks—Bridges and Bridged Networks—Amendment 31: Stream Reservation Protocol (SRP) Enhancements and Performance Improvements", IEEE Computer Society, IEEE Std 802.1Qcc™, Oct. 31, 2018, 208 pages.

"IEEE Standard for Local and metropolitan area networks—Bridges and Bridged Networks—Amendment 29: Cyclic Queuing and Forwarding", IEEE Computer Society, IEEE Std 802.1Qch™, Jun. 28, 2017, 30 pages.

"IEEE Standard for Local and metropolitan area networks—Bridges and Bridged Networks—Amendment 28: Per-Stream Filtering and Policing", IEEE Computer Society, IEEE Std 802.1Qci™, Sep. 28, 2017, 65 pages.

"IEEE Standard for Local and metropolitan area networks—Bridges and Bridged Networks—Amendment 25: Enhancements for Scheduled Traffic", IEEE Computer Society, IEEE Std 802.1Qbv™, Mar. 18, 2016, 57 pages.

"IEEE Standard for Local and metropolitan area networks—Bridges and Bridged Networks—Amendment 26: Frame Preemption", IEEE Computer Society, IEEE Std 802.1Qbu™, Aug. 30, 2016, 52 pages.

"Time-Sensitive Networking (TSN) Task Group", IEEE 802.1, Retrieved on Nov. 16, 2023, Webpage available at : https://1.ieee802.org/tsn/.

"Time Sensitive Networking IP Cores", Fraunhofer IPMS, Retrieved on Nov. 16, 2023, Webpage available at : https://www.ipms.fraunhofer.de/en/Components-and-Systems/Components-and-Systems-Data-Communication/ip-cores/IP-Core-Modules/time-sensitive-networking.html.

Seol et al., "Timely Survey of Time-Sensitive Networking: Past and Future Directions", IEEE Access, vol. 9, Oct. 15, 2021, pp. 142506-142527.

"1830 Time-sensitive Packet Switch (TPS)", Nokia, Retrieved on Nov. 16, 2023, Webpage available at : https://www.nokia.com/networks/optical-networks/1830-time-sensitive-packet-switch-tps/.

Office action received for corresponding Finnish Patent Application No. 20235021, dated May 10, 2023, 15 pages.

Liu et al., "Requirements for Large-Scale Deterministic Networks", Internet-Draft, Deterministic Networking Working Group, Dec. 3, 2022, 16 pages.

"3rd Generation Partnership Project; Technical Specification Group Services and System Aspects; System architecture for the 5G System (5GS); Stage 2 (Release 18)", 3GPP TS 23.501, V18.0.0, Dec. 2022, pp. 1-593.

"3rd Generation Partnership Project; Technical Specification Group Services and System Aspects; Study on timing resiliency and TSC and URLLC enhancements (Release 18)", 3GPP TR 23.700-25, V18.0.0, Dec. 2022, pp. 1-105.

Nasrallah et al., "Ultra-Low Latency (ULL) Networks: The IEEE TSN and IETF DetNet Standards and Related 5G ULL Research", IEEE Communications Surveys & Tutorials, vol. 21, No. 1, Firstquarter 2019, pp. 88-145.

Office action received for corresponding Finnish Patent Application No. 20235021, dated Oct. 30, 2023, 11 pages.

Extended European Search Report, Application No. 23210513.0-1218, Apr. 18, 2024; pages (8).

Wang J Dai J Liu F Zhang Fiberhome Telecom Ltd X: "DetNet Data Plane: IEEE 802.1 Time Sensitive Networking over SRv6 draft-wang-detnettsn-over-srv6-06; draft-wang-detnet-tsn-over-srv6-06.txt", XP015156943; Dec. 19, 2022, pages (14).

Paolucci Francesco et al: "Enhancing 5G SDN/NFV Edge with P4 Data Plane Programmability", XP011860532; Apr. 20, 2021, pp. (154-160).

* cited by examiner

PROTOCOL INDEPENDENT DETERMINISTIC TRANSPORT OF DATA IN A TIME-SENSITIVE NETWORK

TECHNICAL FIELD

The present disclosure relates, in general, to protocol independent deterministic transport of data in a time-sensitive network.

BACKGROUND

In systems based on Ethernet technologies where the tight-coupling of distributed components is necessary, no misses or out-of-order data transmissions can occur. Examples of such systems include scientific computing, high-frequency stock trading systems, and manufacturing line operations. Ethernet transmission can be thought of as best-effort: the sender transmits data in slices, and the receiver reassembles the slices into the original data. If a slice is missing or arrives out of order, the receiver knows how to request another copy of the slice(s) and/or put them into the correct order. These actions of resending and out-of-order assembly take time and create delays in the receiving system, which can present unacceptable jitter.

Time-Sensitive Networks (TSN) is a set of technologies that enable transport of Ethernet packets in networks with the goal of achieving the transport with minimal jitter. Such transport is called "deterministic transport", and the technologies define mechanisms for the time-sensitive transmission of data over deterministic Ethernet networks. As such, currently available TSN solutions relate to deterministic Ethernet packet forwarding and no deterministic interoperability of packet forwarding between different routers is possible. Furthermore, currently employed solutions are not compatible with protocols other than Ethernet. For example, if MPLS forwarding or segment routing is used in the IP network, the deterministic transport is not possible.

SUMMARY

An objective of the present disclosure is to enable deterministic forwarding for any data plane.

The foregoing and other objectives are achieved by the features of the independent claims.

Further implementation forms are apparent from the dependent claims, the description and the Figures.

A first aspect of the present disclosure provides an apparatus for protocol independent deterministic transport of data in a time-sensitive network, the apparatus comprising a processor, a memory coupled to the processor, the memory configured to store program code executable by the processor, the program code comprising one or more instructions, whereby to cause the apparatus to receive synchronisation data from the network, the synchronisation data comprising a measure for a clock frequency supporting transport of deterministic data traffic over the network, receive multiple input packets, the input packets comprising deterministic data traffic and non-deterministic data traffic, and generate, from the multiple input packets and using the synchronisation data, a set of isochronous output packets comprising respective payloads and headers.

Accordingly, the apparatus can ensure TSN operation of the time-sensitive (deterministic/isochronous) traffic while keeping its protocol undisturbed. Time-sensitive network can be extended beyond Ethernet forwarding. The apparatus enables deterministic flow multiplexing and provides a transport solution that is protocol independent.

In an implementation of the first aspect, the program code further comprises one or more instructions, whereby to cause the apparatus to generate the set of isochronous output packets using the synchronisation data and timing information, the timing information comprising information related to at least one of arrival and departure times for deterministic traffic. As such, the periodicity and scheduling of the apparatus's output can meet the constrains related to the timing of the deterministic data flow, thereby supporting transport of deterministic traffic over the time-sensitive network.

The program code may further comprise one or more instructions, whereby to cause the apparatus to receive the timing information from the network. As such, the periods and packet sizes for the deterministic data flow can be known in advance.

The program code may further comprise one or more instructions, whereby to cause the apparatus to analyse the received deterministic data traffic to thereby obtain the timing information. As such, the apparatus can support deterministic data transport even if the timing information is not available.

The received synchronisation data may further comprise phase information supporting transport of deterministic data traffic over the network. As such, the apparatus can ensure that its output is in phase with the network.

Each respective header may comprise a unique number and a unique ID of the respective packet of the set of isochronous output packets. Thus, segmentation/desegmentation of packets can be achieved in a simpler, more efficient manner.

The multiple input packets may be received by the apparatus in form of an aggregated payload, and the program code may further comprise one or more instructions, whereby to cause the apparatus to desegment the aggregated payload to thereby receive the multiple input packets. Thus, the apparatus can handle reception of input packets even if they are not received individually.

The program code may further comprise one or more instructions, whereby to cause the apparatus to generate the set of isochronous output packets in form of an aggregated payload of a fixed size. As such, deterministic treatment for all isochronous traffic processed by the apparatus can be achieved.

A second aspect of the present disclosure provides a method comprising receiving synchronisation data from the network, the synchronisation data comprising a measure for a clock frequency supporting transport of deterministic data traffic over the network, receiving multiple input packets, the input packets comprising deterministic data traffic and non-deterministic data traffic, and generating, from the multiple input packets and using the synchronisation data, a set of isochronous output packets comprising respective payloads and headers.

In an implementation of the second aspect the method further comprises generating the set of isochronous output packets using the synchronisation data and timing information, the timing information comprising information related to at least one of arrival and departure times for deterministic traffic. As such, the periodicity and scheduling of the generated output can meet the constrains related to the timing of the deterministic data flow, thereby supporting transport of deterministic traffic over the time-sensitive network.

The method may further comprise the step of receiving the timing information from the network, or analysing the received deterministic data traffic to thereby obtain the timing information. As such, the periods and packet sizes for the deterministic data flow can be known in advance, or deterministic data transport can be supported even if the timing information is not available.

The received synchronisation data may further comprise phase information supporting transport of deterministic data traffic over the network. As such, the output can be in phase with the rest of the network.

Each respective header may comprise a unique number and a unique ID of the respective packet of the set of isochronous output packets. Thus, segmentation/desegmentation of packets can be achieved in a simpler, more efficient manner.

A third aspect of the present disclosure provides a computer readable storage medium comprising computer program code, accessible by an apparatus comprising a processor, to provide instructions and/or data to the apparatus, the computer program code configured to, with the processor, cause the apparatus to receive synchronisation data from the network, the synchronisation data comprising a measure for a clock frequency supporting transport of deterministic data traffic over the network, receive multiple input packets, the input packets comprising deterministic data traffic and non-deterministic data traffic, and generate, from the multiple input packets and using the synchronisation data, a set of isochronous output packets comprising respective payloads and headers.

In an implementation of the third aspect, the computer program code may be further configured to, with the processor, cause the apparatus to generate the set of isochronous output packets using the synchronisation data and timing information, the timing information comprising information related to arrivals and/or departure times for deterministic traffic. As such, the periodicity and scheduling of the generated output can meet the constrains related to the timing of the deterministic data flow, thereby supporting transport of deterministic traffic over the time-sensitive network.

These and other aspects of the invention will be apparent from the embodiment(s) described below.

BRIEF DESCRIPTION OF THE DRAWINGS

In order that the present invention may be more readily understood, embodiments of the invention will now be described, by way of example, with reference to the accompanying drawings, in which.

DETAILED DESCRIPTION

Figure 1:
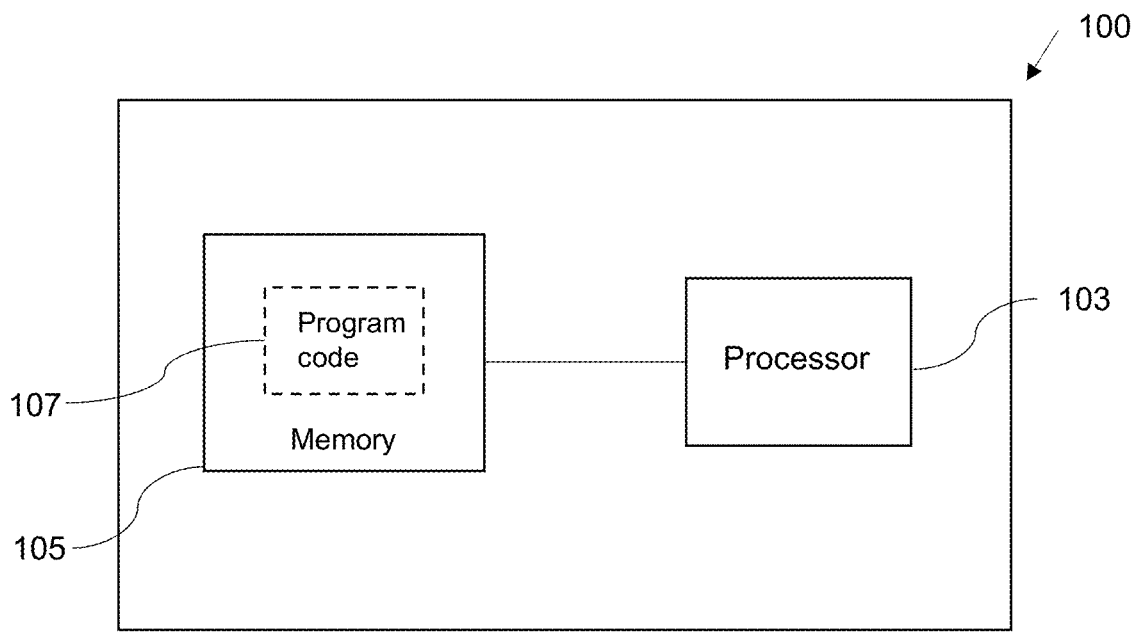
FIG. 1 is a schematic representation of an apparatus according to an example.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

Time-sensitive networks (TSN) can provide deterministic guarantees for traffic forwarding. Deterministic forwarding means that traffic is transported with a deterministically limited jitter. Generally, in the context of network traffic, jitter occurs when there is a time delay in the sending of data packets over the network. This is often caused by network congestion, route changes, and occurs as a result of latency, loss, and packet delay variation. This is different to traditional Quality of Service (QOS) in an IP network, which requires statistical QoS guarantees.

TSNs are traditionally related to Ethernet networks. The IEEE standards that define packet forwarding in Ethernet networks are mostly part of "IEEE 802.1Q" family of protocols: IEEE 802.1AS, IEEE 802.1Qav, IEEE 802.1Qat, IEEE 802.1Qcc, IEEE 802.1Qch, IEEE 802.1Qci, IEEE 802.1Qbv, IEEE 802.1Qbu, etc.

When analysed through the framework of the seven-layer OSI model, many of the changes TSN brings occur within Layer 2 of Ethernet. These Layer 2 changes enable deterministic flow multiplexing and transport over Ethernet, when the synchronization of switches in phase and a clock is provided. That is, deterministic flow multiplexing and transport solution is dependent on the Layer 2 Ethernet protocol.

Until recently, network switches and routers were based on Application Specific Integrated Circuits (ASICs). These generally perform well but are not very flexible since their data-plane functionality is hard-coded in hardware and usually does not change during the lifetime of the device.

P4 (Programming Protocol-independent Packet Processors) is a language enabling data-plane programming during the exploitation lifetime of devices, which is a novel paradigm, differing from the approach used by traditional ASIC switches. Furthermore, P4 is target-independent (e.g., it can be applied to CPUs, FPGAs, SoCs, etc.) and it is protocol-independent (it supports all data-plane protocols and can be used to develop new protocols).

According to an example, there is provided a protocol independent TSN (PIT) apparatus that supports deterministic data forwarding for any data plane. The PIT apparatus can ensure the TSN operation of the time-sensitive (e.g., deterministic) traffic while keeping the protocol undisturbed. The PIT apparatus can ensure that time-sensitive networking is applied to protocols other than Ethernet, allowing it to extend beyond Ethernet forwarding.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a machine such as a general-purpose computer, user equipment such as a smart device, e.g., a smart phone, a special purpose computer, an embedded processor or processors of other programmable data processing devices to realize the functions described in the description and diagrams. In particular, a processor or processing apparatus may execute the machine-readable instructions. Thus, modules of apparatus (for example, a module implementing a scheduler, a synchronisation module, a timing module and so on) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode. For example, the instructions may be provided on a non-transitory computer readable storage medium encoded with instructions, executable by a processor.

FIG. 1 is a schematic representation of an apparatus for protocol independent deterministic transport of data in a time-sensitive network according to an example. The apparatus 100 can be, e.g., a computing system or apparatus, user equipment, a network device (physical or virtual) such as a router (e.g., a PIT router), a switch, or a similar network device. The apparatus 100 comprises a processor 103, and a memory 105 coupled to the processor 103 and configured to store instructions or program code 107, executable by the processor 103. The memory 105 may comprise any type of non-transitory system memory such as static random-access memory (SRAM), dynamic random-access memory (DRAM), synchronous DRAM (SDRAM), read-only memory (ROM), or a combination thereof.

In an example, apparatus 100 can be functionally implemented using P4, for function re-programmability/re-programmability and accelerated performance when deployed on an accelerator such as a FPGA card. In an example, implementation or deployment using an FPGA enables deterministic latency. Implementing the apparatus 100 in P4 helps achieve the aim of supporting any type of header processing, thereby achieving support for any data protocol, as will be explained in more detail below. Furthermore, the use of P4 enables the apparatus 100 to be reprogrammable in real-time. The apparatus 100 may support any type of data forwarding, such as Ethernet, IP, MPLS, ATM, UPF, and similar.

The program code 107 comprises one or more instructions, whereby to cause the apparatus 100 to receive synchronisation data from the time-sensitive network. The synchronisation data comprises a measure of, for or relating to a clock frequency for the network that can be used to implement transport of deterministic data traffic over a time-sensitive network. The term "deterministic" can be interpreted, in an example, to mean "isochronous", and vice versa. Deterministic traffic refers to traffic with known arrival times, i.e. with a fixed periodicity, and constant data size. As such, the clock frequency can be used to determine a periodicity for transport of deterministic data traffic. The apparatus 100 may receive the synchronisation data via, for example, a synchronisation module.

The apparatus 100 may check or prompt the time-sensitive network for new or updated synchronisation data and, in an example, synchronisation data can be distributed throughout the network and/or to any one or more specific network apparatus using any compatible protocol. The apparatus 100 may verify whether it is operating at a clock frequency that is in line with or the same as the clock frequency associated with the rest of the network. If the apparatus 100 finds that the clock frequency does not match the clock frequency of the time-sensitive network, the apparatus 100 may adjust its clock frequency. In other words, the frequency of the packets at the output of the apparatus 100 may be aligned with the frequency of the clock signal that is present on the same electronic board (e.g. FPGA) that is used to implement the apparatus 100. Said clock signal may be used to serialise the packets before sending them to the output line, e.g. an output fibre. The clock frequency may be present on the same electronic board used to implement the apparatus 100, or received from an external source, i.e. from the network. In another implementation, the apparatus 100 may be interconnected to a dedicated electronic circuit arranged to receive the synchronisation data that is transported in the network by means of specialised networking synchronisation protocols. The electronic circuit may create the clock signal to be used to serialise the aggregated packets at the output of the apparatus 100.

In addition to the measure for the clock frequency, the received synchronisation data may comprise phase information supporting transport of deterministic data traffic over the time-sensitive network. In such a case, the apparatus 100 may verify whether its prevailing clock frequency is adjusted to be in phase with the that of the rest of the network. If the apparatus 100 determines that the phase does not match the phase of the time-sensitive network, the apparatus 100 may adjust its phase in order to match the phase of the time-sensitive network.

Figure 4:
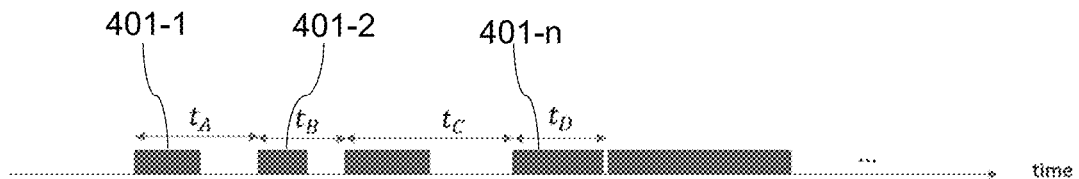
FIG. 4 is a schematic representation of non-deterministic data traffic according to an example.
Figure 5:
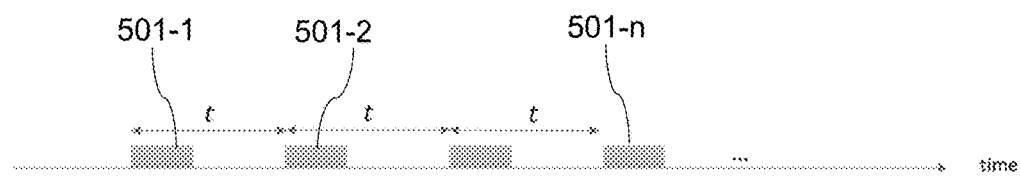
FIG. 5 is a schematic representation of deterministic data traffic according to an example.

The program code 107 comprises one or more instructions, whereby to cause the apparatus 100 to receive multiple input packets. The input packets comprise deterministic data traffic and regular (non-deterministic) data traffic. FIG. 4 is a schematic representation of non-deterministic data traffic according to an example. As shown in the figure, non-deterministic data packets 401-1, . . . , 401-$n$ may vary in packet size. Furthermore, the time intervals ta, tB, etc. between the non-deterministic data packets are also variable. In contrast, FIG. 5 is a schematic representation of deterministic data traffic according to an example. Such traffic is isochronous (as described in more detail further below). Deterministic data packets 501-1, . . . , 501-$n$ may have a fixed packet size and fixed packet interarrival times t.

The multiple input packets may be received by the apparatus 100 in the form of an aggregated payload comprising multiple deterministic and/or non-deterministic packets. The program code 107 may further comprise one or more instructions, whereby to cause the apparatus to de-segment the aggregated payload in order to obtain the multiple input packets. Accordingly, the apparatus can separate individual deterministic and/or non-deterministic packets from an input aggregated payload.

In an example, the apparatus 100 may receive the multiple input packets from multiple input queues. There may be separate input queues for deterministic and non-deterministic traffic. The input queues may further be separated into, for example, a local traffic input queue, and a transit (e.g., cross-network) input queue.

In an example, a received aggregated payload can comprise a PIT P4 header comprising a unique number of each packet segment and a unique ID of each packet, simplifying the de-segmentation process performed by the apparatus 100. Separation between the received packets of the received aggregated payload may be implemented using the information carried in the PIT P4 header, as described in more detail below.

According to an example, the program code 107 further comprises one or more instructions, whereby to cause the apparatus 100 to generate, from the multiple input packets and using the synchronisation data, a set of isochronous output packets comprising respective payloads and headers. The apparatus 100 may generate the set of isochronous output packets in form of an aggregated payload of a fixed size, preceded by a single shared header, e.g. a PIT P4 header. The apparatus 100 may generate multiple aggregated payloads, each of which are output at a periodic intervals.

Figure 6:
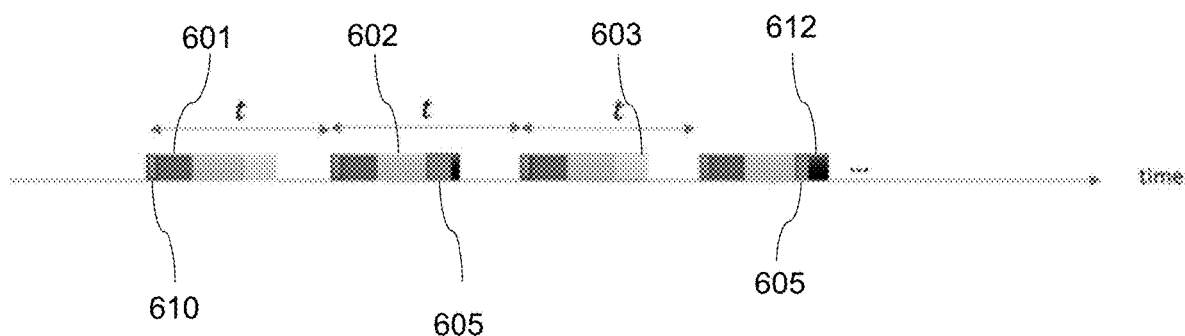
FIG. 6 is a schematic representation of a generated aggregated payload according to an example.

FIG. 6 is a schematic representation of a generated aggregated payload according to an example. The output of the apparatus 100 may combine/multiplex different deterministic flows. As shown in FIG. 6, the generated aggregated output may combine two deterministic flows of periodicity t (601, 602) with one deterministic flow of periodicity 2t (603). At the same time, the aggregated payload may also include the non-deterministic traffic packets of the variable sizes, such as the non-deterministic flow 605. In order to maintain the fixed size of the isochronous output of the apparatus 100, variable size padding bits 612 may be included so as to complete the size of the generated payload.

A generated aggregated payload may comprise several packets or packet segments. In an example, an aggregated payload can comprise several, or all of, the packets from a set of isochronous output packets. Information about the packets (or packet segments) in the generated aggregated payload is carried in a header portion.

In an example, the aggregated payload at the output of the apparatus 100 may comprise a header, such as a PIT P4 header 610 shown in FIG. 6. A header can comprise a unique number and a unique ID for a packet and/or for multiple packets.

A header may comprise a PIT P4 header. The PIT P4 header may comprise all the information required for packet segmentation/desegmentation at the next hop. Using the PIT P4 header helps achieve fast and simple packet desegmentation/segmentation, virtually eliminating any latency. Example PIT P4 header fields, as well as the type of information comprised therein, are shown below in tabular form. While the following example comprises the feature of desegmentation/segmentation, this feature is optional and may not necessarily be included in all of the PIT P4 headers.

| PIT P4 header field | Information comprised therein |
| --- | --- |
| Num_packets | Number of aggregated packets |
| Seg_flag[max_num_packets] | Flags for each aggregated packet, indicating whether the segmentation/de-segmentation of each such packet is required or not |
| Header_size | Size of this PIT P4 header (to calculate the size of padding at the end of the aggregated packet) |
| Information_tuple_per_aggregated_packet[max_num_packets] | (Type of aggregated packet {deterministic or not}, size of aggregated packet, unique ID of packet flow {with respect to the source of this PIT P4 header}, segment number of the transported payload {in range from 1 until Sg, where Sg is the symbol for the end of segmentation}) |
| Outer_IP_header | The outer IP header included in this PIT P4 header, with the source address of the PIT router that has created this PIT P4 header and aggregated packet and the destination address of the final PIT P4 router |
| Outer_UDP_header | The outer UDP header included in this P4 header, allowing to transport the PIT aggregated packets and to specify the source and destination ports for PIT aggregated packets |

The program code 107 may comprise one or more instructions, whereby to cause the apparatus 100 to generate the set of isochronous output packets using the aforementioned synchronisation data and timing information. The timing information may comprise information related to arrivals and/or departure times for deterministic traffic (or for each deterministic flow). The apparatus 100 may verify whether the periodicity and scheduling of its output packets respect the constraints of the timing information. If the apparatus 100 finds that the constraints are not adhered with, the apparatus 100 may make adjustments to its operation. The generated set of isochronous output packets may then be transmitted over the time-sensitive network.

The program code 107 may comprise one or more instructions, whereby to cause the apparatus 100 to receive the timing information from the timing sensitive network. The apparatus 100 may check or prompt the time-sensitive network for new or updated timing information. Timing information can be distributed using any compatible protocol. If timing information is received from the time-sensitive network, the period and packet sizes for the deterministic traffic (or for each deterministic flow) may be known in advance.

Alternatively, the program code 107 may comprise one or more instructions, whereby to cause the apparatus 100 to analyse the received deterministic data traffic to thereby obtain the timing information. That is, the apparatus 100 may detect the deterministic traffic period and packet sizes during its operation.

The apparatus 100 may serve all the input traffic, both deterministic and non-deterministic (isochronous), by respecting the isochronous (periodic) nature of its output, and constraints (such as the synchronisation and timing constraints). To serve the traffic, the apparatus 100 may calculate an order of packet dequeuing from different input queues (for example, deterministic and non-deterministic, and/or local and transit) and generate the aggregated payload based thereon. During the dequeuing process, if some of the packets need to be segmented so that they can be sent in several cycles, the headers (or a single shared header) carry all the information about the desegmentation/segmentation process. The operation allows the deterministic treatment for all isochronous traffic processed by the PIT router.

In particular, if required, the segmentation may be achieved by separating the packets according to the input they originated from and/or type of traffic, e.g. by separating the packets according to whether they comprise local or transit traffic, or according to whether they are deterministic or non-deterministic. The separated packets may be transported within different aggregated output packets of the apparatus 100. Through the use of the previously-described fields of the PIT P4 header, the segmentation may comprise enumerating the parts (i.e. the segments) of each payload. During desegmentation, the packet may be reconstructed through the use of the information included in the PIT P4 header.

Advantageously, the apparatus 100 supports deterministic forwarding for any plane. The protocol independence may be achieved using the programmable data plane based on P4. The deterministic forwarding may be achieved thanks to the use of timing information for deterministic traffic profiles. The apparatus 100 enables deterministic flow multiplexing and provides a transport solution that is protocol independent.

Figure 2:
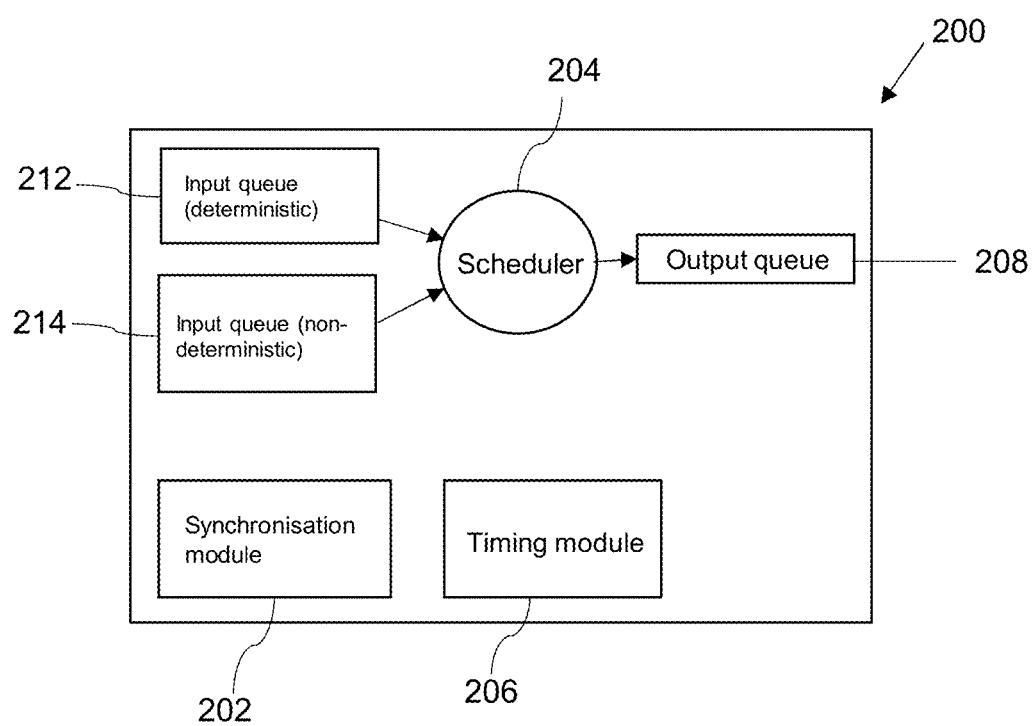
FIG. 2 is a schematic representation of a router for protocol independent deterministic transport of data in a time-sensitive network according to an example.

FIG. 2 is a schematic representation of a router 200 for protocol independent deterministic transport of data in a time-sensitive network according to an example. In particular, FIG. 2 shows the apparatus 100 when implemented in the form of a router, a switch, or a similar network apparatus.

The router 200 may comprise synchronisation module 202, a scheduler 204, a timing module 206, an output queue 208, and separate input queues 212 and 214 serving deterministic (isochronous) and non-deterministic traffic, respectively. In a specific implementation, the router 200 may comprise additional input queues to further separate the deterministic and non-deterministic traffic into local deterministic and non-deterministic traffic and transit deterministic and non-deterministic traffic.

The synchronisation module 202 may check for new (or updated) synchronisation data from the time-sensitive network. The synchronisation module may verify whether the PIT router 200 is adjusted in clock frequency (and optionally phase) with the rest of the time-sensitive network and make adjustments if necessary. The timing module 206 may check for timing information related to the deterministic traffic. The timing module 206 may verify whether the periodicity and scheduling of the router 200 meet the constraints of the timing information and make adjustments to the scheduler's 204 operation if required.

The deterministic traffic may be received in the form of an aggregated payload, as previously discussed in relation to FIG. 1. The deterministic traffic may be desegmented if required and the queued in the input queue 212. The scheduler 204 serves traffic from both input queues 212 and 214 by respecting the isochronous (periodical) of its output, as well as the synchronisation and timing constraints.

To serve the traffic, the scheduler 204 calculates the order of packet dequeuing from the input queues 212 and 214 and creates a periodical aggregated payload on the output queue 208.

Figure 3:
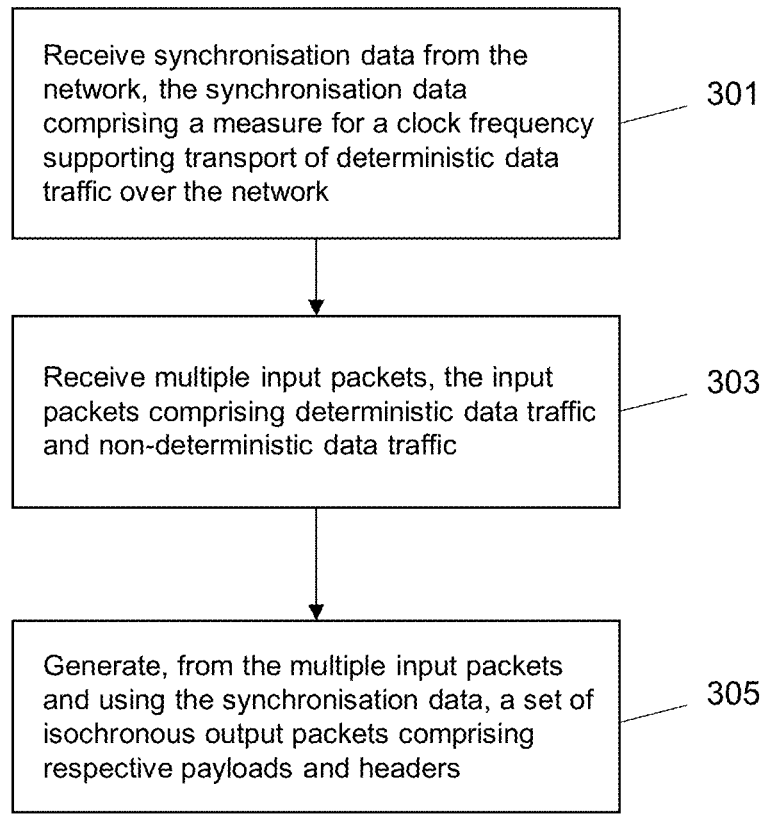
FIG. 3 is a flow chart of a method for protocol independent deterministic transport of data in a time-sensitive network according to an example.

FIG. 3 is a flow chart of a method for protocol independent deterministic transport of data in a time-sensitive network according to an example. In Step 301, the method comprises receiving synchronisation data from the network, the synchronisation data comprising a measure for a clock frequency supporting transport of deterministic data traffic over the network. The received synchronisation data may further comprise phase information supporting transport of deterministic data traffic over the network.

In Step 303, the method comprises receiving multiple input packets, the input packets comprising deterministic and non-deterministic data traffic. In Step 305, the method comprises generating, from the multiple input packets and using the synchronisation data, a set of isochronous output packets comprising respective payloads and headers. Each respective header may comprise a unique number and a unique ID of the respective packet of the set of isochronous output packets.

Generating the set of isochronous output packets may comprise using timing information as well as the synchronisation data. The timing information may comprise information related to at least one of arrival and departure times for deterministic traffic. The method may further comprise receiving the timing information from the network or analysing the received deterministic data traffic to thereby obtain the timing information.

According to an example, machine-readable instructions can be loaded onto a computer or other programmable data processing devices, so that the computer or other programmable data processing devices perform a series of operations to produce computer-implemented processing, thus the instructions executed on the computer or other programmable devices provide an operation for realizing functions specified by flow(s) in the flow charts and/or block(s) in the block diagrams.

Further, the teachings herein may be implemented in the form of a computer or software product, such as a non-transitory machine-readable storage medium, the computer software or product being stored in a storage medium and comprising a plurality of instructions, e.g., machine readable instructions, for making a computer device implement the methods recited in the examples of the present disclosure.

In some examples, some methods can be performed in a cloud-computing or network-based environment. Cloud-computing environments may provide various services and applications via the Internet. These cloud-based services (e.g., software as a service, platform as a service, infrastructure as a service, etc.) may be accessible through a web browser or other remote interface of the user equipment for example. Various functions described herein may be provided through a remote desktop environment or any other cloud-based computing environment.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein. In addition, one or more of the modules described herein may transform data, physical devices, and/or representations of physical devices from one form to another.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims in determining the scope of the instant disclosure.

The invention claimed is:

1. An apparatus for protocol independent deterministic transport of data in a time-sensitive network, the apparatus comprising: at least one processor; and at least one memory including instructions which, when executed by the at least one processor, cause the apparatus to: receive synchronization data from the time-sensitive network, the synchronization data comprising a measure for a clock frequency supporting transport of deterministic data traffic over the time-sensitive network; receive multiple input packets, the input packets comprising deterministic data traffic and non-deterministic data traffic; determine timing information comprising information related to at least one of arrival times or departure times for deterministic traffic; and generate, from the multiple input packets and using the synchronization data and the timing information, a set of isochronous output packets comprising respective payloads and headers, the set of isochronous output packets preceded by a protocol-independent packet header.

2. The apparatus of claim 1, wherein the instructions, when executed by the at least one processor, cause the apparatus to:
receive the timing information from the time-sensitive network.

3. The apparatus of claim 1, wherein the instructions, when executed by the at least one processor, cause the apparatus to:
analyze the received deterministic data traffic to thereby obtain the timing information.

4. The apparatus of claim 3, wherein the received synchronization data further comprises phase information supporting transport of deterministic data traffic over the time-sensitive network.

5. The apparatus of claim 4, wherein each respective header comprises a unique number and a unique ID of the respective packet of the set of isochronous output packets.

6. The apparatus of claim 5, wherein the multiple input packets are received by the apparatus in form of an aggregated payload, wherein the instructions, when executed by the at least one processor, cause the apparatus to:
desegment the aggregated payload to thereby receive the multiple input packets.

7. The apparatus of claim 6, wherein the instructions, when executed by the at least one processor, cause the apparatus to:
generate the set of isochronous output packets in form of an aggregated payload of a fixed size.

8. A method for protocol independent deterministic transport of data in a time-sensitive network, the method comprising:
receiving synchronization data from the time-sensitive network, the synchronization data comprising a measure for a clock frequency supporting transport of deterministic data traffic over the time-sensitive network;
receiving multiple input packets, the input packets comprising deterministic data traffic and non-deterministic data traffic;
determining timing information comprising information related to at least one of arrival times or departure times for deterministic traffic; and
generating, from the multiple input packets and using the synchronization data and the timing information, a set of isochronous output packets comprising respective payloads and headers, the set of isochronous output packets preceded by a protocol-independent packet header.

9. The method of claim 8, further comprising receiving the timing information from the time-sensitive network, or analyzing the received deterministic data traffic to thereby obtain the timing information.

10. The method of claim 9, wherein the received synchronization data further comprises phase information supporting transport of deterministic data traffic over the time-sensitive network.

11. The method of claim 10, wherein each respective header comprises a unique number and a unique ID of the respective packet of the set of isochronous output packets.

12. A non-transitory computer readable storage medium storing instructions which, when executed by an apparatus, cause the apparatus to:
receive synchronization data from the time-sensitive network, the synchronization data comprising a measure for a clock frequency supporting transport of deterministic data traffic over the time-sensitive network;
receive multiple input packets, the input packets comprising deterministic data traffic and non-deterministic data traffic;
determine timing information comprising information related to at least one of arrival times or departure times for deterministic traffic; and
generate, from the multiple input packets and using the synchronization data and the timing information, a set of isochronous output packets comprising respective payloads and headers, the set of isochronous output packets preceded by a protocol-independent packet header.

* * * * *